United States Patent
Althaus

(10) Patent No.: US 7,954,330 B2
(45) Date of Patent: Jun. 7, 2011

(54) METHOD FOR OPERATING A POWER PLANT AND POWER PLANT

(75) Inventor: Rolf Althaus, Herrliberg (CH)

(73) Assignee: Alstom Technology Ltd, Baden (CH)

( * ) Notice: Subject to any disclaimer, the term of this patent is extended or adjusted under 35 U.S.C. 154(b) by 381 days.

(21) Appl. No.: 11/635,516

(22) Filed: Dec. 8, 2006

(65) Prior Publication Data

US 2007/0107415 A1 May 17, 2007

Related U.S. Application Data

(63) Continuation of application No. PCT/EP2005/052595, filed on Jun. 7, 2005.

(30) Foreign Application Priority Data

Jun. 11, 2004 (DE) .......................... 10 2004 028 531

(51) Int. Cl.
*F02C 1/00* (2006.01)

(52) U.S. Cl. .............................. 60/772; 60/39.5; 60/727

(58) Field of Classification Search ............... 60/39.094, 60/779, 727, 39.181, 39.183, 726, 728, 772, 60/39.5, 39.13, 281
See application file for complete search history.

(56) References Cited

U.S. PATENT DOCUMENTS

| | | | | |
|---|---|---|---|---|
| 2,325,619 A * | 7/1943 | Lysholm | .......................... | 60/786 |
| 2,655,788 A * | 10/1953 | Sedille | ........................ | 60/39.461 |
| 2,759,802 A * | 8/1956 | Potter et al. | .................... | 422/112 |
| 4,154,055 A * | 5/1979 | Pulick et al. | .................... | 60/39.5 |
| 4,441,028 A * | 4/1984 | Lundberg | ........................ | 290/52 |
| 4,630,436 A * | 12/1986 | Frutschi | ....................... | 60/39.183 |
| 5,379,589 A * | 1/1995 | Cohn et al. | .................... | 60/39.59 |
| 5,454,220 A | 10/1995 | Althaus et al. | | |
| 5,495,709 A * | 3/1996 | Frutschi | ....................... | 60/39.55 |
| 5,537,822 A | 7/1996 | Shnaid et al. | | |
| 5,778,675 A * | 7/1998 | Nakhamkin | .................... | 60/652 |
| 6,305,158 B1 * | 10/2001 | Nakhamkin et al. | ......... | 60/39.53 |
| 6,334,436 B1 * | 1/2002 | Paffrath et al. | ............... | 123/563 |
| 6,745,569 B2 | 6/2004 | Gerdes | | |
| 7,150,154 B2 * | 12/2006 | Althaus et al. | .................. | 60/727 |

(Continued)

FOREIGN PATENT DOCUMENTS

DE          44 10 440 A1     8/1995

(Continued)

OTHER PUBLICATIONS

German Search Report dated Aug. 13, 2007 (with English translation of category of cited documents).

(Continued)

*Primary Examiner* — Michael Cuff
*Assistant Examiner* — Phutthiwat Wongwian
(74) *Attorney, Agent, or Firm* — Buchanan Ingersoll & Rooney PC

(57) ABSTRACT

A method for operating a power plant is disclosed. The power plant comprises a power machine and a flue gas flow path following downstream of the power machine. A flue gas flow path is scavenged with fresh air before the flue gas flow path is acted upon with flue gas. To carry out the scavenging operation, air is extracted from a pressure accumulator and the air is introduced into the flue gas flow path downstream of the power machine. The power machine can be an exhaust gas heat exchanger.

13 Claims, 4 Drawing Sheets

U.S. PATENT DOCUMENTS

| | | | |
|---|---|---|---|
| 7,406,828 B1 * | 8/2008 | Nakhamkin | 60/772 |
| 7,500,349 B2 * | 3/2009 | Althaus | 60/39.511 |
| 2002/0050134 A1 * | 5/2002 | Bronicki et al. | 60/39.182 |
| 2002/0092304 A1 | 7/2002 | Liebig et al. | |
| 2003/0013159 A1 | 1/2003 | Cohen et al. | |
| 2003/0033809 A1 * | 2/2003 | Konezciny et al. | 60/772 |
| 2003/0033810 A1 * | 2/2003 | Kreitmeier | 60/772 |
| 2003/0131599 A1 * | 7/2003 | Gerdes | 60/727 |
| 2003/0167773 A1 | 9/2003 | Mathias et al. | |
| 2004/0065089 A1 | 4/2004 | Liebig | |

FOREIGN PATENT DOCUMENTS

| | | |
|---|---|---|
| DE | 100 64 263 A1 | 7/2002 |
| DE | 102 58 594 A1 | 7/2003 |
| EP | 0 620 362 B1 | 10/1994 |

OTHER PUBLICATIONS

International Search Report dated Aug. 16, 2005.
Written Opinion of the International Searching Authority.

* cited by examiner

METHOD FOR OPERATING A POWER PLANT AND POWER PLANT

CROSS REFERENCE TO RELATED APPLICATIONS

This application is based on and claims priority under 35 U.S.C. §119 to German Application No. 10 2004 028 531.4, filed Jun. 11, 2004 and is a continuation application under 35 U.S.C. §120 of International Application No. PCT/EP2005/ 052595, filed Jun. 7, 2005 designating the U.S., the entire contents of both of which are hereby incorporated by reference.

FIELD

A method for operating a power plant is disclosed, including a power plant for carrying out the method.

BACKGROUND INFORMATION

It is known to scavenge the exhaust gas tract of gas turbines or gas turbo groups with fresh air after a standstill before the flue gases take action. This avoids the situation where combustible gases, which may potentially accumulate during lengthy standstill phases, ignite when the plant is put into operation. The importance of this scavenging operation comes to the fore particularly when the arrangement of exhaust gas heat exchangers in the flue gas tract of a gas turbo group or of another thermal power engine provides large volumes in which ignitable gas mixtures may potentially accumulate. For example, in combined-cycle power plants, to drive the gas turbo group for several minutes without firing before the gas turbo group is put into operation, in order thereby to generate a flow of fresh air through the waste-heat recovery steam generator. Only when the volume of the waste-heat recovery steam generator has been conveyed, for example, five times by the gas turbo group does an ignition of the gas turbo group take place. On account of the limited maximum throughput through the gas turbo group, such an operation takes up several minutes, typically of the order of ten minutes to 20 minutes. The result of this is that power plants of this type can deliver power to the network, from standstill, only after a comparatively long delay time. In air accumulator plants, too, the stored fluid is in most instances heated in an exhaust gas heat exchanger before it is supplied to the expansion machine. Accordingly, even these plants, which are intended per se for covering peak load and in which short start-up times are therefore desirable, can deliver to the network only after delay.

SUMMARY

Applicant has disclosed a method for operating a power plant which can remedy these problems. An exemplary method as disclosed can avoid these and other disadvantages of the prior art. In one aspect, the disclosed exemplary method can be employed to drastically reduce the waiting times for putting a power plant into operation which are caused by the scavenging operation.

One aspect of the disclosed method, therefore, is not to convey the air required for carrying out the scavenging operation by means of the power engine preceding the flue gas flow path or to supply this air to the flue gas flow path through the power engine, but, instead, to extract the air required for carrying out the scavenging operation, under pressure, from an accumulator volume and to supply it to the flue gas flow path essentially directly, that is to say bypassing preceding power engines. The disclosed method is suitable most especially for the scavenging of exhaust gas heat exchangers, in particular of waste-heat recovery steam generators, which are arranged in the flue gas flow path and which serve, for example, for the generation of fresh steam for the steam circuit of a combined-cycle plant or for the generation of process steam or heating steam, or of air preheaters, such as serve, for example for supplying heat to the accumulator fluid of air accumulator plants.

The disclosed method is suitable particularly for use in air accumulator plants having an accumulator volume which is filled with compressed air. The air which is required for scavenging the flue gas flow path can in this case be extracted directly from the accumulator volume of the pressure accumulator plant. If, in a simple gas turbine plant or a combined-cycle plant, such an accumulator volume is absent, an accumulator vessel may advantageously be arranged above ground or below ground, which is connected to a charging compressor. The accumulator volume is then advantageously designed such that its standard volume, that is to say its accumulator capacity with respect to the ambient pressure, amounts to 5 to 30 times the volume to be scavenged. A piston compressor or screw compressor may then be used, for example, as a charging compressor and can charge this accumulator volume to the nominal pressure within a time span of, for example, one hour.

In one exemplary embodiment of the method, the air is introduced into the flue gas flow path directly upstream of an exhaust gas heat exchanger. In another exemplary embodiment of the method, in a power plant in which a firing device is arranged downstream of the power engine and upstream of an exhaust gas heat exchanger, the air is introduced upstream of the firing device into the flow path leading from the power engine to the firing device.

In a further exemplary embodiment of the method, during the scavenging operation, the power engine is set in movement, that is to say, for example, a turbine is rotated. As a result, in addition to the first air mass flow which is extracted from the pressure accumulator and is introduced into the flow path downstream of the power engine, a second air mass flow is conveyed through the flue gas flow path. For example, when the power engine and the accumulator fluid expansion machine are identical, that is to say when, in stationary operation, the accumulator fluid mass flow expanded in the expansion machine is supplied to an exhaust gas heat exchanger on the primary side, a second air mass flow is conducted out of the accumulator volume into the expansion machine during the method.

An exemplary power plant suitable for carrying out the disclosed exemplary methods comprises a line with a shut-off member, said line leading from the pressure accumulator to the flue gas flow path and, in particular, to the primary-side flow path of an exhaust gas heat exchanger. In the framework of the statements made here, moreover, that part of a heat exchanger through which the heat-emitting fluid flows is designated as the primary side. Correspondingly, that part through which the heat-absorbing fluid flows is designated as the secondary side. In one embodiment of this power plant, a flow path leads from the pressure accumulator through a secondary-side flow path of the exhaust gas heat exchanger and from there to an accumulator fluid expansion machine. In this exemplary embodiment, the first air mass flow which is extracted for scavenging the exhaust gas heat exchanger can be branched off upstream of the secondary-side flow path of the exhaust gas heat exchanger.

In one exemplary embodiment of the power plant, the output from the accumulator fluid expansion machine leads to the primary side of the exhaust gas heat exchanger. Accordingly, the accumulator fluid expansion machine and the power machine, which is arranged upstream of the exhaust gas heat exchanger, may be identical. Such a pressure accumulator plant is known, for example, from DE 102 58 594, which publication in this respect is incorporated by reference in the present disclosure, constituting an integral part of the present disclosure. It is also known, further, from this publication to arrange a firing device in the flow path of the accumulator fluid. From DE 44 10 440, it is known, moreover, to arrange an exhaust gas heat exchanger in the exhaust gas flow of a gas turbo group and to conduct the accumulator fluid of a pressure accumulator plant through this exhaust gas heat exchanger, where the accumulator fluid is heated by means of the exhaust-gas heat of the gas turbo group. Applicant's disclosure can also be employed effectively in this case.

BRIEF DESCRIPTION OF THE DRAWING

The invention is explained in more detail below by means of exemplary embodiments illustrated in the drawing in which, in particular.

The exemplary embodiments and the figures should be understood as being explanatory and should not be used to restrict the disclosed subject matter.

DETAILED DESCRIPTION

Figure 1:
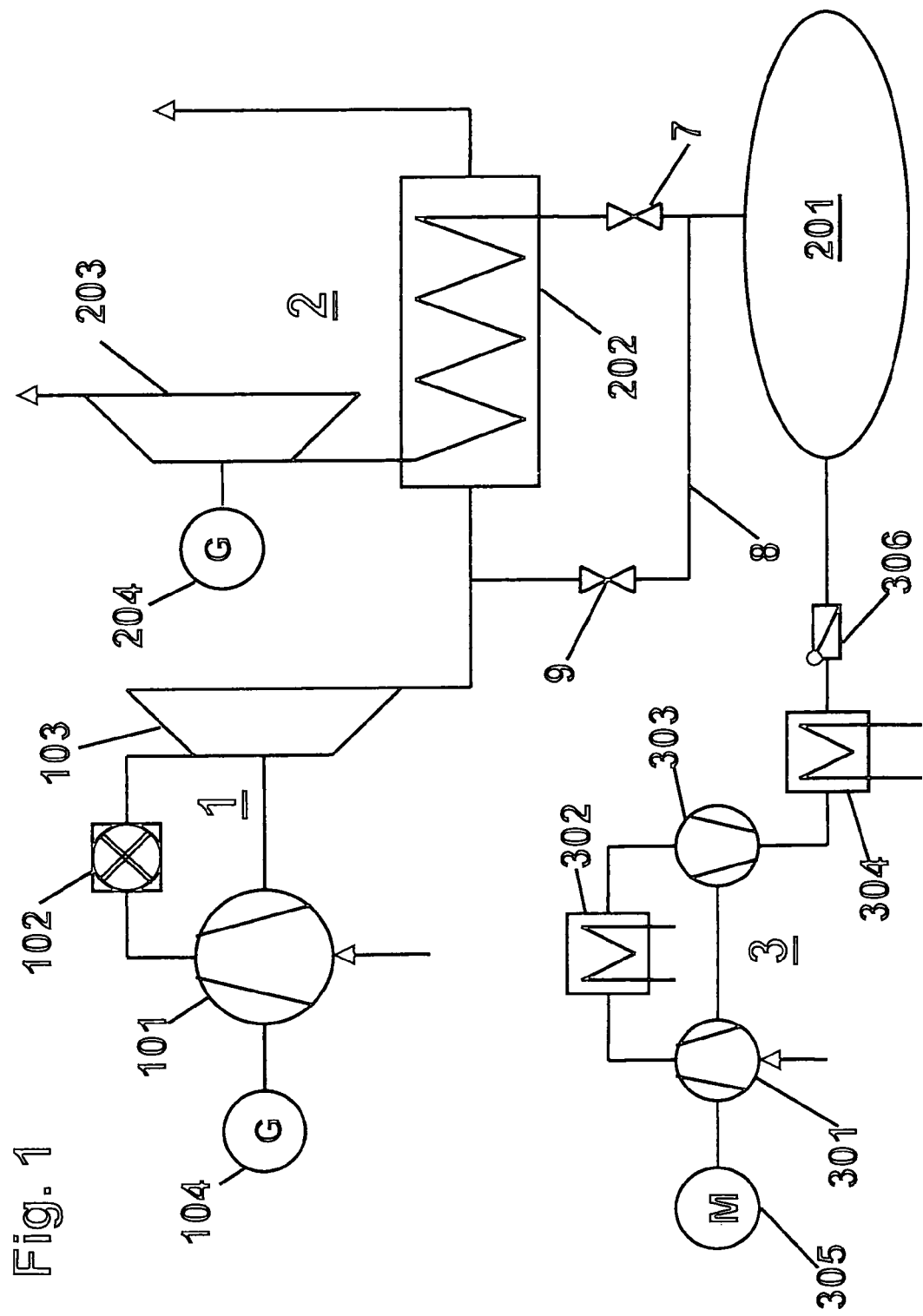
FIG. 1 shows a first example of a power plant suitable for carrying out the method according to the invention.

FIG. 1 shows an exemplary power plant. An exemplary gas turbo group 1 comprises a compressor 101, a combustion chamber 102 and a turbine 103. The type of construction of the gas turbo group is in this case not essential to the invention; it will be possible, for example, readily to make use of a multi-shaft arrangement of a gas turbo group or else a gas turbine with sequential combustion, as is known from EP 620 362. The gas turbo group drives a generator 104 for generating useful electrical power. In the flue gas flow path of the expanded flue gases flowing out of the turbine 103, an exhaust gas heat exchanger 202 is arranged. The hot flue gases flow through the latter on its primary side. On the secondary side, a fluid stored under pressure in an accumulator volume 201 can be conducted through the heat exchanger 202. The mass flow of the accumulator fluid is controlled by the accumulator fluid actuating member 7. The accumulator fluid flows through the exhaust gas heat exchanger in countercurrent to the flue gas and in this case absorbs heat from the flue gases. The heated accumulator fluid is expanded in the accumulator fluid expansion turbine 203 so as to perform work. The turbine 203 drives the generator 204 which likewise generates a useful electrical power. The accumulator volume 201, the exhaust gas heat exchanger 202, the turbine 203 and the generator 204 together form a pressure accumulator plant 2. It is basically possible, and is also known from the prior art, to arrange the gas turbo group 1 and the accumulator fluid expansion turbine 203 on a common shafting, the gas turbo group 1 and the accumulator fluid expansion machine 203 acting on a common generator. In times of low electricity demand and correspondingly low power prices, the compressor arrangement 3 is operated in order to fill the accumulator volume 201 with compressed air which, in times of high electricity demand and correspondingly high power prices, is available again for electricity generation by means of the turbine 203 and the generator 204. The compressor arrangement 3 comprises a first compressor 301, a first cooler 302, a second compressor 303 and a second cooler 304 and, furthermore, a nonreturn member 306 and a motor 305. The compressors 301 and 303 are arranged together with the motor 305 on a common shaft. When the compressor arrangement 3 is in operation, air is sucked in by the compressor 301 and compressed, cooled in the first cooler 302, compressed further in the second compressor 303, cooled once again in the second cooler 304 and conveyed to the accumulator volume 201 via the nonreturn member 306. The nonreturn member 306 prevents the backflow of fluid from the accumulator volume 201 in the compressor train. After a plant standstill, the primary side of the exhaust gas heat exchanger 202 has to be scavenged before the gas turbo group 1 is put into operation. This avoids the situation where combustible gases, which have potentially collected on the primary side of the exhaust gas heat exchanger, ignite when the combustion chamber 102 is ignited. For this purpose, according to the prior art, the gas turbo group 1 is driven by the motively operated generator 104, with the result that a flow through the primary side of the exhaust gas heat exchanger is induced. The fresh air mass flow available in this case is limited. The scavenging of the exhaust gas heat exchanger therefore takes up several minutes. In this case, the power plant illustrated can deliver power to the network only with a long delay. In the power plant illustrated in FIG. 1, therefore, a line 8 branches off from the flow path of the accumulator fluid and issues, upstream of the exhaust gas heat exchanger, in the flue gas flow path of the gas turbo group 1. A firing device may also be arranged between the turbine 103 of the gas turbo group 1 and the exhaust gas heat exchanger 202; the scavenging air line 8 can then issue, upstream or downstream of the firing device, in the flue gas flow path. The line may be closed or opened by means of a shut-off and/or actuating member 9. According to the invention, when the plant is started up, the shut-off member 9 is opened. At the same time, the gas turbo group 1 can be driven by the electromotively operated generator 104. In addition to the mass flow conveyed by the gas turbo group, accumulator fluid then flows out of the accumulator volume 201 through the exhaust gas heat exchanger 202. The fresh air mass flow then available for scavenging the exhaust gas heat exchanger amounts to a multiple of that which is provided by the gas turbo group driven empty. For this reason, the time necessary for scavenging the primary side of the exhaust gas heat exchanger is appreciably reduced, and the power plant can deliver power to the electricity network more quickly. After the scavenging of the primary side of the exhaust gas heat exchanger 202, the shut-off member 9 is closed again. The further start-up operation of the power plant is then carried out in a way known to a person skilled in the art.

Figure 2:
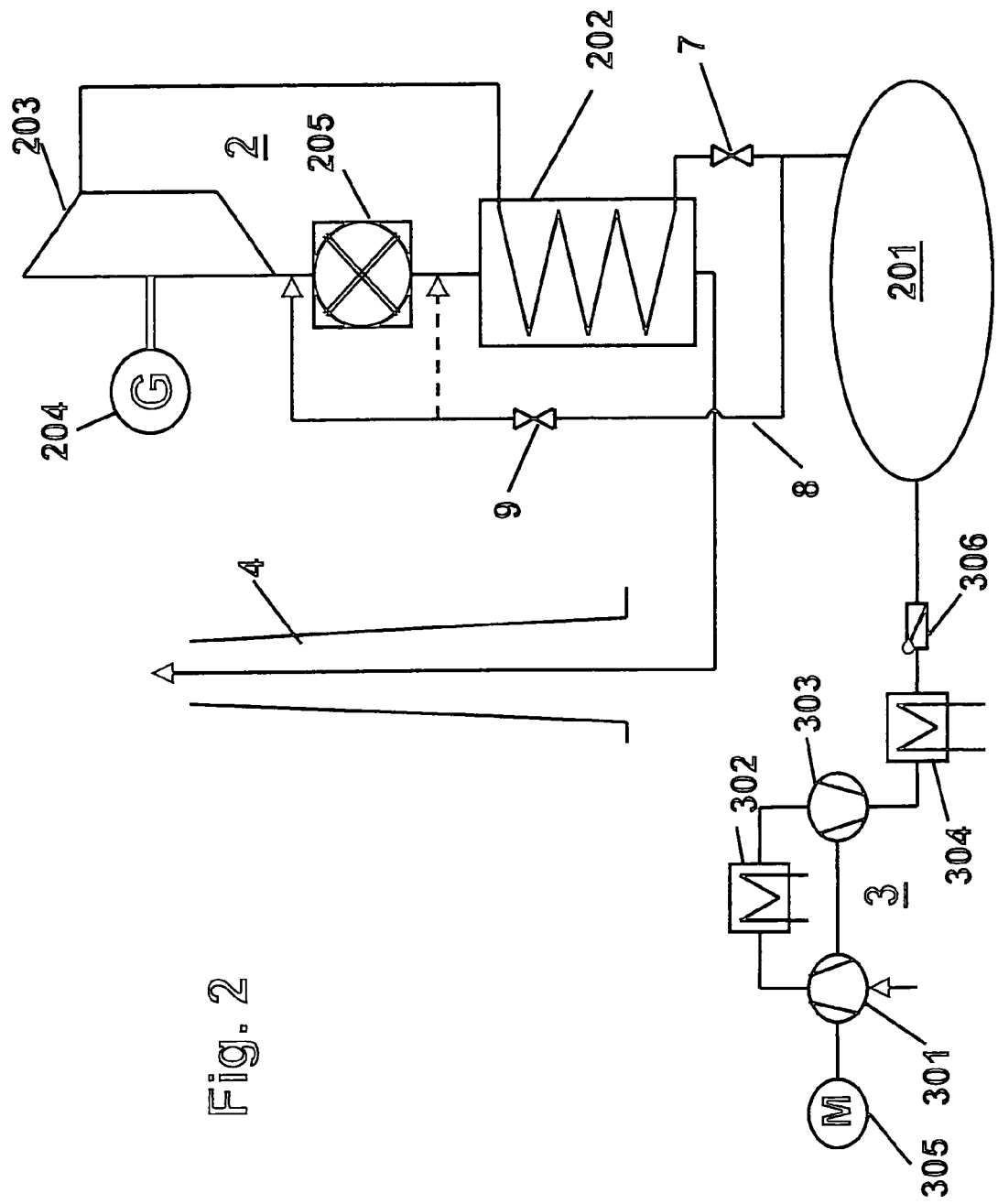
FIG. 2 shows a second example of a power plant suitable for carrying out the method according to the invention.

In the exemplary power plant illustrated in FIG. 2, the gas turbo group is omitted. Compressed air stored in the accumulator volume 201 flows via the actuating member 7 into the secondary-side flow path of the heat exchanger 202. The accumulator fluid is heated there in heat exchange with a flue gas flowing on the primary side of the heat exchanger. The heated accumulator fluid flows to the accumulator fluid expansion turbine 203 where the accumulator fluid is expanded so as to perform work. The shaft power generated in this case serves for driving the generator 204. The expanded accumulator fluid flows into a firing device 205 and is heated there. The hot flue gas occurring flows into the primary side of the exhaust gas heat exchanger 202 and, when it flows through, is cooled in heat exchange with the accumulator fluid, before it flows out into the surroundings through a chimney 4. In the power plant illustrated in the exemplary embodiment, when the power plant is put into operation again after a standstill the actuating member 7 can be opened a specific amount for the necessary scavenging of the primary side of the exhaust gas heat exchanger 202, with the result that accumulator fluid flows through the turbine 203, the firing device 205 and the primary side of the exhaust gas heat exchanger 202 and thus ensures that combustible gases are no longer contained there. At the same time, the shut-off member 9 is opened, with the result that additional accumulator fluid is conducted via the line 8 into the flow path downstream of the turbine 203. This accumulator fluid can be introduced upstream of the firing device, but, as illustrated by the dashed line, can also be introduced into the flue gas flow path directly upstream of the primary side of the exhaust gas heat exchanger 202. Introducing the scavenging air upstream of the firing device 205 has the advantage in this case that, by means of the air introduced there, the firing device can be put into operation at a very early stage in the start-up operation and the exhaust gas heat exchanger 202 can be preheated, with the result that the start-up times can be further reduced.

Figure 3:
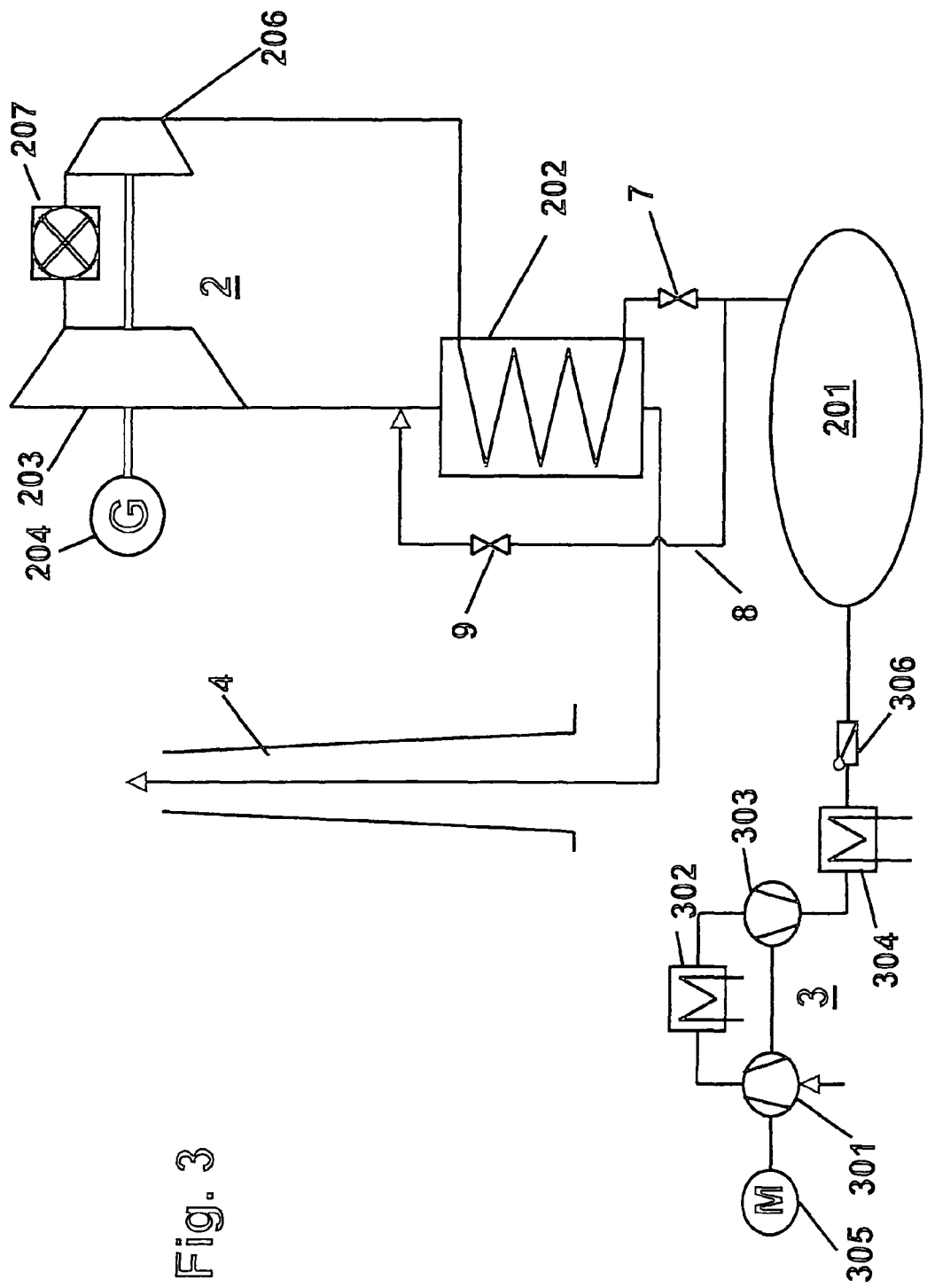
FIG. 3 shows a further example of a power plant suitable for implementing the method according to the invention.

The exemplary embodiment illustrated in FIG. 3 corresponds, in terms of carrying out the scavenging operation for the primary side of the exhaust gas heat exchanger 202, essentially to what has already been discussed in connection with FIG. 2. However, the power plant illustrated here differs in terms of the accumulator fluid expansion machine. This corresponds essentially to a type of construction also known from DE 102 58 594. Accumulator fluid flows through the exhaust gas heat exchanger 202 on the secondary side before it is partly expanded in a first turbine 206. The partly expanded accumulator fluid flows to a combustion chamber 207 where it is heated as a result of the combustion of a fuel. The flue gas occurring is expanded further in the turbine 203 and flows through the exhaust gas heat exchanger 202 on the primary side, in countercurrent to the accumulator fluid, the flue gas being cooled in heat exchange with the accumulator fluid flowing on the secondary side. Of course, as proposed in DE 102 58 594, a further firing device may be arranged between the turbine 203 and the primary-side flow path of the exhaust gas heat exchanger 202. The issue of the scavenging fluid which is routed via the line 8 and the shut-off member 9 may then likewise take place upstream or downstream of the firing device.

Figure 4:
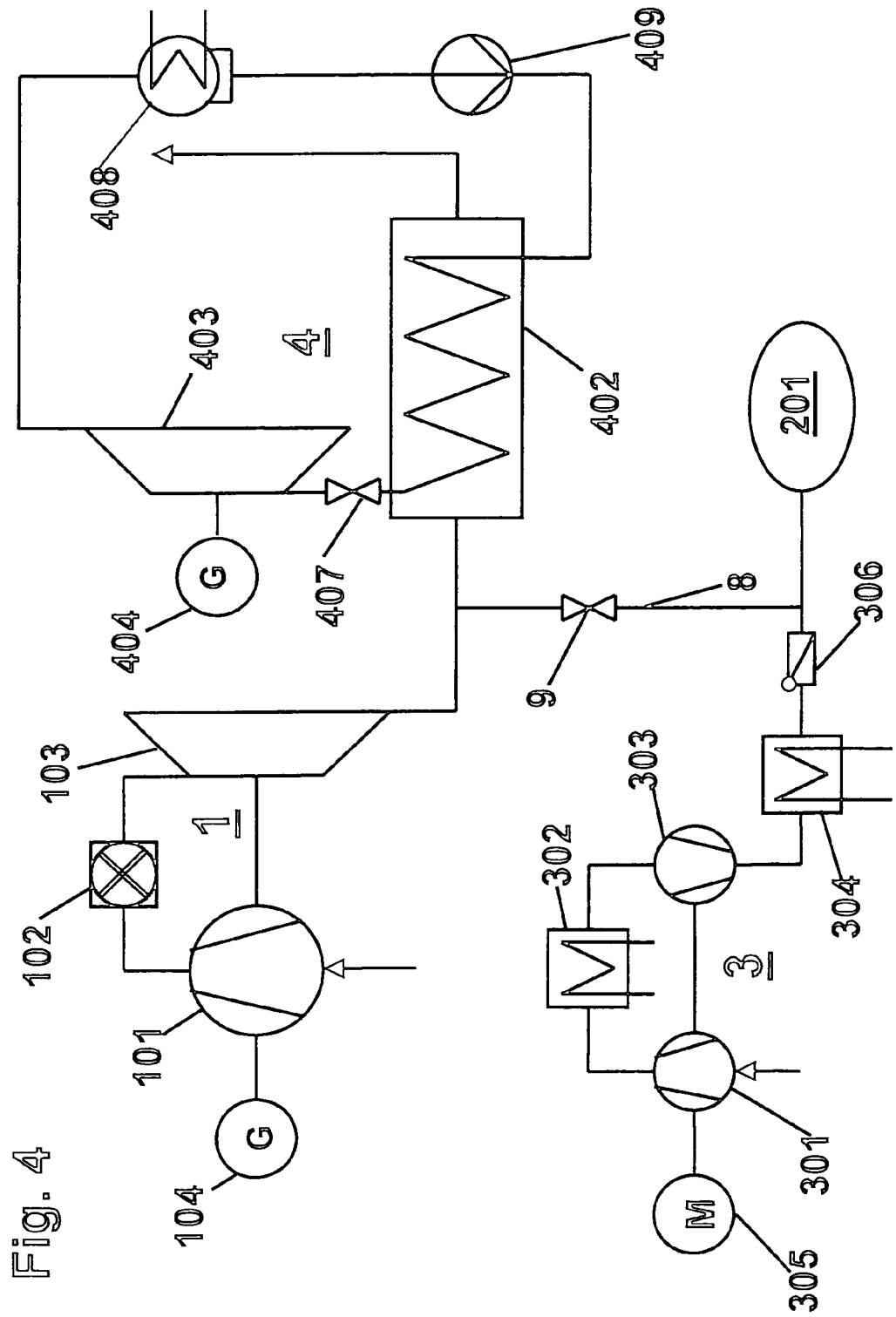
FIG. 4 shows a fourth example of a power plant suitable for implementing the method according to the invention.

FIG. 4 exemplifies an application of the disclosed method with reference to a combined-cycle plant. The combined-cycle plant comprises the gas turbo group 1 and the water/steam circuit 4. The water/steam circuit comprises a waste-heat recovery steam generator 402 through which the flue gas from the gas turbo group 1 flows on the primary side. A boiler feed pump 409 conveys a feed water mass flow through the secondary-side flow paths of the waste-heat recovery steam generator 402. Fresh steam is generated from the feed water by means of the exhaust gas heat of the gas turbo group and is supplied to a steam turbine 403 via a fresh steam actuating member 407. In the steam turbine 403, the steam is expanded so as to perform work, and a generator 404 is driven by means of the useful power thus generated. It is also known in the prior art for the steam turbine 403 and the gas turbo group 1 to be of single-shaft design such that they act on a common generator. The expanded steam is condensed in a condenser 408, and the condensate occurring is supplied to the boiler feed pump 409 again. The water/steam circuit is in this case illustrated in greatly simplified form. Moreover, the embodiment of the water/steam circuit is not essential to the invention. The steam could just as well be used for process or heating purposes. In conventional combined-cycle plants, the waste-heat recovery steam generator 402 has to be scavenged before the gas turbo group 1 is started, wherein the gas turbo group 1 is set in rotation and therefore a flow through the waste-heat recovery steam generator is induced. As illustrated initially, this operation takes up several minutes. In the power plant illustrated, an air accumulator 201 is arranged, which is filled with compressed air by a compressor arrangement 3. Accordingly, for scavenging the primary-side flow path of the waste-heat recovery steam generator 402, the shut-off member 9 is opened and air is introduced from the accumulator 201 through the line 8 into the flue gas flow path of the gas turbo group. The scavenging air mass flow achievable here is substantially greater than the air mass flow which can be achieved when the gas turbo group is rotated at a limited rotational speed. The scavenging operation is thereby terminated substantially more quickly. That is to say, the combustion chamber 102 of the gas turbo group can be ignited earlier, with the result that the combined-cycle plant can be connected to the network more quickly. As compared with the exemplary embodiments illustrated in the above figures, the accumulator volume 201 is substantially smaller because the stored air does not serve for power generation, but for scavenging the exhaust gas tract in the gas turbo group 1. It may be assumed, as a rule of thumb, that, for scavenging the waste-heat recovery steam generator 402, the volume of the latter should be replaced about five times. The result of this is that the air mass stored in the accumulator volume 201 should be greater than five times the content of the steam generator 402. Values of between five times and thirty times can be selected. This makes it possible, after a possibly faulty starting attempt, to scavenge the waste-heat recovery steam generator 402 a second time with air stored in the accumulator volume 201. The charging compressors 3 may also be configured correspondingly for relatively low mass flows. For example, piston compressors or screw compressors may be employed here.

Exemplary embodiments described above and the drawing also open up to a person skilled in the art embodiments of the invention which differ from the exemplary embodiments and which are contained in the scope of the patent claims. The invention, as characterized in the claims, is likewise suitable for scavenging the exhaust gas tract of a simple gas turbo group.

It will be appreciated by those of ordinary skill in the art that the exemplary circuit breakers described here can be embodied in various specific forms without departing from the essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

LIST OF REFERENCE SYMBOLS

1 Gas turbo group
2 Pressure accumulator plant
3 Compressor plant
4 Chimney
7 Accumulator fluid actuating member
8 Scavenging air line
9 Shut-off member
101 Compressor 102 Combustion chamber
103 Turbine
104 Generator
201 Pressure accumulator, accumulator volume
202 Heat exchanger, exhaust gas heat exchanger
203 Accumulator fluid expansion machine
204 Generator
205 Firing device
206 Accumulator fluid expansion machine
207 Combustion chamber
301 Compressor
302 Cooler
303 Compressor
304 Cooler
305 Motor
306 Nonreturn member
402 Exhaust gas heat exchanger, waste-heat recovery steam generator
403 Steam turbine
404 Generator
407 Fresh steam actuating member
408 Condenser
409 Feed pump

The invention claimed is:

1. A method for operating a power plant including a power machine and a flue gas flow path following downstream of the power machine, which method comprises:
scavenging the flue gas flow path with fresh air during an off cycle of the power plant, wherein, to carry out the scavenging operation, air is extracted from a pressure accumulator and the air is introduced into the flue gas flow path from downstream of the power machine exhaust outlet.

2. The method as claimed in claim 1, a heat-emitting primary side of an exhaust gas heat exchanger being arranged in the flue gas flow path.

3. The method as claimed in claim 2, the exhaust gas heat exchanger being a waste-heat recovery steam generator.

4. The method as claimed in claim 1, the pressure accumulator being a pressure accumulator of a pressure accumulator plant with an accumulator fluid expansion machine.

5. The method as claimed in claim 4, the power machine and the accumulator fluid expansion machine being identical, wherein a second air mass flow is conducted out of the accumulator volume into the accumulator fluid expansion machine during the scavenging operation.

6. The method as claimed in claim 4, a secondary-side flow path of the exhaust gas heat exchanger leading from the pressure accumulator to the accumulator fluid expansion machine comprising branching off the air upstream of the secondary-side flow path of the exhaust gas heat exchanger.

7. The method as claimed in claim 2, comprising introducing the air into the flue gas flow path directly upstream of the exhaust gas heat exchanger.

8. The method as claimed in claim 2, a firing device being arranged downstream of the power machine and upstream of the exhaust gas heat exchanger, wherein the air is introduced upstream of the firing device into the flow path leading from the power machine to the firing device.

9. The method as claimed in claim 8, wherein the power machine is set in movement during the scavenging operation.

10. The method as claimed in claim 2, the pressure accumulator being a pressure accumulator of a pressure accumulator plant with an accumulator fluid expansion machine.

11. The method as claimed in claim 3, the pressure accumulator being a pressure accumulator of a pressure accumulator plant with an accumulator fluid expansion machine.

12. The method as claimed in claim 5, a secondary-side flow path of the exhaust gas heat exchanger leading from the pressure accumulator to the accumulator fluid expansion machine comprising branching off the air upstream of the secondary-side flow path of the exhaust gas heat exchanger.

13. A method for operating a power plant including a gas turbo group comprising a compressor, a combustion chamber and a turbine, wherein a flue gas flow path is downstream of the gas turbo group, the method comprising:
scavenging the flue gas flow path with fresh air during an off cycle of the power plant, wherein to carry out the scavenging operation, air is extracted from a pressure accumulator and the air is introduced into the flue gas flow path from downstream of the gas turbo group exhaust outlet.

* * * * *